United States Patent [19]

Forsey, Jr.

[11] 3,866,538

[45] Feb. 18, 1975

[54] PASSENGER CONVEYOR
[75] Inventor: Thomas Forsey, Jr., Akron, Ohio
[73] Assignee: The Goodyear Tire & Rubber Company, Akron, Ohio
[22] Filed: July 5, 1973
[21] Appl. No.: 376,422

Related U.S. Application Data
[63] Continuation-in-part of Ser. No. 217,735, Jan. 14, 1972, abandoned.

[52] U.S. Cl. ............................... 104/167, 198/213
[51] Int. Cl. ............................................. B61b 13/00
[58] Field of Search ............ 198/213; 104/166, 167

[56] References Cited
UNITED STATES PATENTS

| | | | |
|---|---|---|---|
| 428,639 | 5/1890 | Siccardi | 104/167 |
| 1,741,981 | 12/1929 | Dewey et al. | 198/213 |
| 1,752,432 | 4/1930 | Hepburn | 198/213 |
| 2,620,917 | 12/1952 | Dahlberg | 198/213 |
| 3,191,762 | 6/1965 | Brietzke | 198/213 |
| 3,727,746 | 4/1973 | Slusher | 198/213 |

Primary Examiner—James B. Marbert
Assistant Examiner—Joseph E. Valenza
Attorney, Agent, or Firm—F. W. Brunner; R. P. Yaist; F. K. Lacher

[57] ABSTRACT

A passenger conveyor system having platforms driven by a rotating screw through wheels in engagement with a helical drive rail on the rotating screw which is supported at intervals along the screw by rollers at spaced-apart positions around the screw. The rollers have helical grooves of the same pitch as the screw with the ribs in engagement with the root diameter of the screw. Gear teeth on the rollers engage the screw thread or root diameter of the screw whereby the rollers drive the screw. In curved sections of the conveyor system, the screw is flexible and supported by rollers with convex and concave supporting surfaces.

9 Claims, 10 Drawing Figures

PATENTED FEB 18 1975 3,866,538
SHEET 1 OF 2
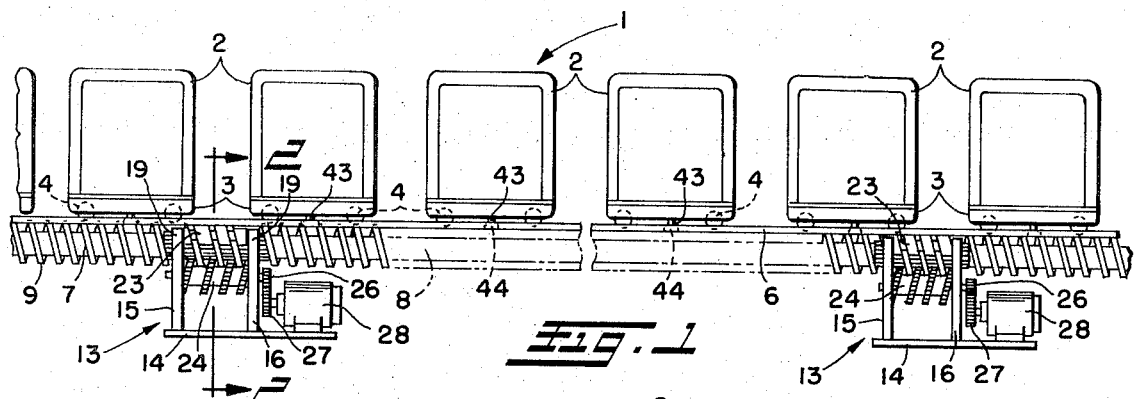
Fig. 1
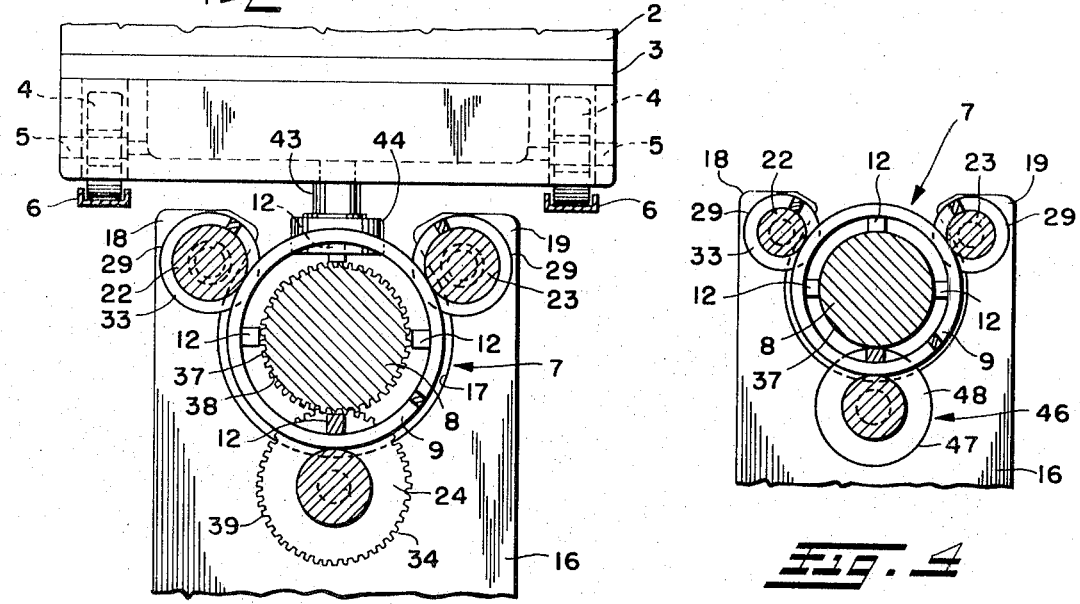
Fig. 2
Fig. 4
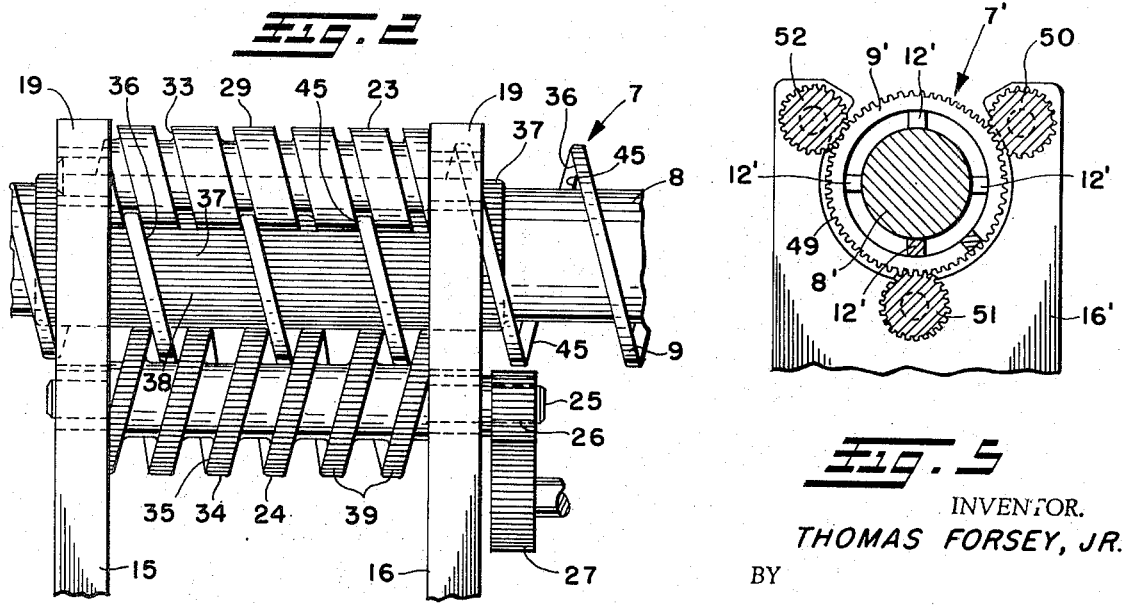
Fig. 3
Fig. 5
INVENTOR.
THOMAS FORSEY, JR.
BY
Oberlin, Maky, Donnelly & Renner
ATTORNEYS

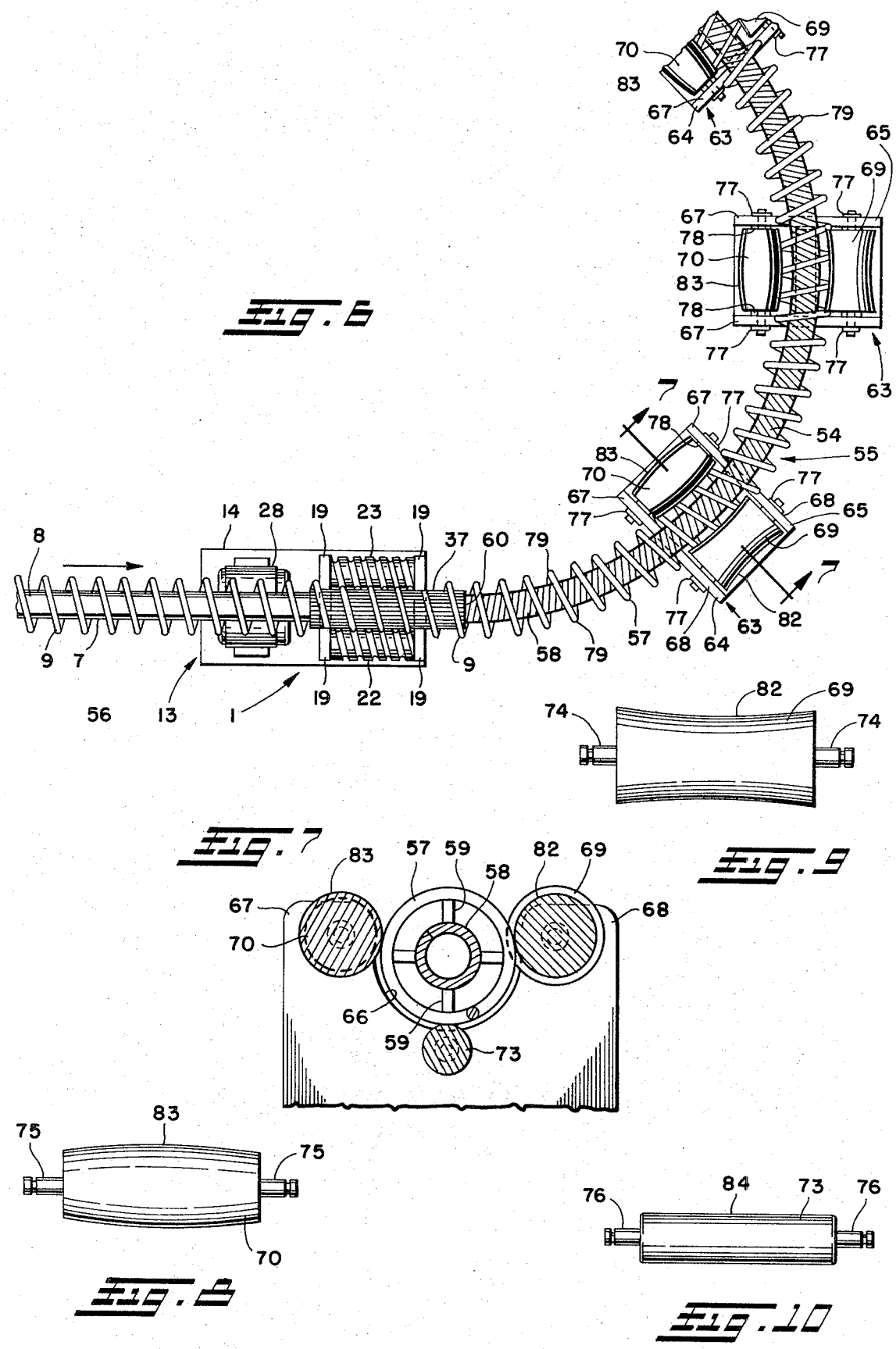

PASSENGER CONVEYOR

This application is a continuation-in-part of copending U.S. application Ser. No. 217,735 filed Jan. 14, 1972 now abandoned and relates generally as indicated to a conveyor system of the type in which passenger or load carrying platforms are driven by a rotating screw located alongside the track on which the platforms roll. Driven wheels projecting from the platforms engage the helical rails of the screw and move the platforms upon rotation of the screw.

Passenger carrying systems of this type have been constructed and used heretofore and it has been found that special mechanisms are required for driving a long screw at intervals along the conveyor. This is especially difficult when the helical rail on the screw must be continuous to maintain movement of the passenger carrying platforms over the portion of the screw which is being driven. In addition to turning the screw, the axial thrust must be counteracted to prevent axial movement of the screw and maintain it in position at all times regardless of the change in load on the conveyor. Because of these requirements, the use of a screw for propelling passenger conveyor platforms has not been widely used even though it is well known that such a drive has an initial low cost and requires a minimum of maintenance. Screw driven passenger conveyor systems have also been limited to relatively straight sections because of the difficulties of providing screw drives in curved sections.

With the foregoing in mind it is the principal object of this invention to provide a screw driven conveyor system in which the screw is driven at spaced-apart intervals without requiring an interruption in the driving rail.

Another object is to provide for supporting and constraining radial movement of the screw under loaded and unloaded conditions.

A further object of the invention is to provide for resisting the thrust forces imposed on the screw during the driving operation.

A still further object of the invention is to provide a plurality of roller members spaced around the screw at intervals along the length of the screw to constrain the movement of the screw.

Another object of the invention is to provide rollers having gear teeth in driving engagement with the screw.

Still another object of the invention is to provide rollers with helical grooves for receiving the flights of the screw and having bearing surfaces engageable with the root diameter of the screw as well as the ribs.

A further object of the invention is to provide rollers with concave and convex surfaces spaced around a flexible screw at a curved section of the conveyor system to support the screw.

These and other objects of the present invention may be achieved by providing at least three rollers spaced around the circumference of the screw at suitable intervals determined by loading factors to hold the shaft and helical rail in position. The spaces between the rollers provide openings to the rails through which the passenger carrying platforms can be driven. These rollers may be cylindrical and have helical grooves for accommodating the helical rails. The constraining rollers may also engage the rails or engage the shaft and the shaft may be enlarged in the area of the rollers to reduce the diameter of the rollers and the depth of the grooves in the rollers. Thrust forces on the rod and shaft may be taken by the rollers through engagement of the helical rail with the helical grooves of the rollers. Some of the rollers may also be driven and have gear teeth at the radially outer surface for engagement with either the radially outer surface of the helical rail of the screw or the radially outer surface of the shaft of the screw. The shaft of the screw may also be grooved for receiving the screw flights of the rollers to constrain radial movement of the screw and resist thrust forces.

To the accomplishment of the foregoing and related ends, the invention, then, comprises the features hereinafter fully described and particularly pointed out in the claims, the following description and the annexed drawings setting forth in detail certain illustrative embodiments of the invention and modifications thereof, this being indicative, however, of but some of the various ways in which the principles of the invention may be employed.

In the annexed drawings:

FIG. 1 is a schematic side elevational view of a portion of a typical screw driven passenger conveyor system incorporating the preferred form of mechanism for driving passenger carrying cabs.

FIG. 2 is an enlarged fragmentary sectional view taken along the plane of line 2—2 of FIG. 1.

FIG. 3 is an enlarged fragmentary side elevational view of the rollers and screw at the driving portion of the conveyor system.

FIG. 4 is a fragmentary sectional plan view like FIG. 2 of a modified roller mechanism embodying the invention.

FIG. 5 is a fragmentary sectional plan view like FIG. 2 of another modification embodying the invention.

FIG. 6 is a schematic plan view of a further modification as applied to a flexible screw of the curved section of the passenger conveyor system shown in FIG. 1, parts being broken away.

FIG. 7 is a sectional view taken along the plane of line 7—7 of FIG. 6.

FIG. 8 is an enlarged side view of one of the rollers of the modification of FIG. 6 showing the convex supporting surface.

FIG. 9 is an enlarged side view of one of the rollers of the modification of FIG. 6 showing the concave supporting surface.

FIG. 10 is an enlarged side view of one of the rollers of the modification of FIG. 6 showing the straight supporting surface.

Referring to FIG. 1, there is schematically shown a screw driven conveyor 1 in which passenger carrying cabs 2 are carried on driven platforms 3. Supporting wheels 4 are rotatably mounted on shafts 5, shown more clearly in FIG. 2, fastened to the driven platform 3. Channel shaped tracks 6 under the driven platforms 3 support the wheels 4 and direct them in a desired path.

A screw 7 for propelling the platforms 3 is positioned alongside the path of the conveyor and in a generally parallel relationship to the tracks 6. As shown in FIGS. 1, 2 and 3, the screw 7 is preferably located under the track 6 and platforms 3 where it will not obstruct the loading and unloading of the cabs 2. The screw preferably has a central shaft 8 with a helical rib or rail 9 extending around the shaft at a spaced-apart distance and connected to the shaft by radially extending spokes 12 which may be at appropriate circumferentially spaced-apart positions. As shown in FIGS. 1, 2 and 3, the screw 7 is supported by supporting structures 13 located at intervals along the length of the screw. Each of the supporting structures 13 has a base 14 and side members 15 and 16, all of which may be of steel plates welded together or other suitable material with the base mounted on a suitable foundation. As shown in FIG. 2, each of the side members 15 and 16 are in the form of a yoke having an opening 17 in the center for the screw 7 and arms 18 and 19 for supporting the upper roller members such as guide rollers 22 and 23 mounted in suitable bearings in positions substantially parallel to the screw 7. A third roller member such as drive roller 24 is rotatably mounted beneath the screw 7 and between the side members 15 and 16 with an end shaft 25 extending through the side member 16 and carrying a pinion 26 in meshing engagement with a gear 27 driven by power means such as electric motor 28 mounted on the base 14 of the supporting structure 13.

In the embodiment shown in FIGS. 1, 2 and 3, the guide rollers 22 and 23 have a cylindrical outer surface 29 with a helical groove 33 having a pitch such that the rail 9 of screw 7 is received in the groove and contained therein preventing transverse movement of the screw and also counteracting axial movement of the screw due to thrust forces exerted against the screw.

The drive roller 24 also has a cylindrical outer surface 34 with helical grooves 35 in which the rail 9 of screw 7 extends and is enveloped as shown in FIGS. 1, 2 and 3. Between the flights of the rail 9 is a helical groove 36 of the screw 7 and at the base of this groove or root diameter of the screw is the central shaft 8 having a load bearing surface 37 which in this embodiment has longitudinally extending gear teeth 38 in meshing engagement with gear teeth 39 on the cylindrical outer surface 34 of the drive roller 24.

A stub shaft 43 or driven member is mounted on the platform 3 and extends downwardly into the helical groove 36 of the screw 7. A wheel 44 is rotatably mounted on the stub shaft 43 and has a diameter substantially the same as the width of the helical groove 36. The rail 9 has a helical driving surface 45 at the sides of the helical groove 36 and this surface is in driving engagement with the wheel 44.

As shown in FIG. 3, the load bearing surface 37 at the root diameter of the screw 7 on the central shaft 8 has a diameter greater than the diameter of the screw at the other locations along the screw where there is no engagement with the drive rollers. This enlarged diameter makes possible a drive roller with a helical groove 35 of lesser depth than would be required if the root diameter were constant along the full length of the screw 7.

In operation, the electric motor 28 drives the gear 27 in meshing engagement with pinion 26 and thereby rotates the drive roller 24. This driving force is transmitted to the central shaft 8 through gear teeth 38 and 39 which results in rotation of the screw 7. As the screw 7 is rotated, the rail 9 engages the wheel 44 and propels the driven platforms 3 along the length of the screw. The guide rollers 22 and 23, which also engage the rail 9, hold the screw 7 radially in position with the gear teeth 38 of the screw in meshing engagement with the gear teeth 39 of the drive roller 24. As shown in FIG. 2, the guide rollers 22 and 23 and drive roller 24 are mounted at circumferentially spaced-apart positions around the screw 7 with the distance between the rollers being less than the outer diameter of the outer surface of the helical rail 9. The rollers 22, 23 and 24 are also mounted on the side members 15 and 16 with the angular spacing of one of the rollers with relation to the other two rollers being at angles greater than 90° around the circumference of the screw 7. The opening between the guide rollers 22 and 23 provides a space for the entrance of stub shaft 43 and wheel 44 attached to the platforms 33 and thereby permits uninterrupted movement of the platforms along the screw 7.

Referring to FIG. 4, a modification is shown in which the drive roller 24 is replaced by a third guide roller 46 having a cylindrical outer surface 47 with helical grooves 48 for receiving and enveloping the rails 9 of the screw 7. The outer cylindrical surface 47 of the third guide roller 46 is in rolling engagement with the load bearing surface 37 of the screw 7 providing restraint of the screw in the radial and transverse directions. The guide rollers 22 and 23 also envelope the rail 9 and hold the screw 7 in a transverse direction while absorbing some of the thrust forces.

Referring to FIG. 5, another modification is shown in which the screw 7' has a helical rail 9' and a central shaft 8' connected by spokes 12' and positioned within a side member 16' of a supporting structure 13', now shown. The rail 9' has gear teeth 49 at the outer periphery and these are in meshing engagement with elongated gears 50, 51 and 52 extending between side member 15', not shown, and side member 16' of the supporting structure 13'. The gears 50, 51 and 52 are driven by suitable means, not shown, and thereby turn the screw 7' which is in driving engagement with a wheel 44' connected to a platform 3' of a passenger carrying cab 2', not shown. This turning movement of the helical rails 9' propels the platforms 3' along the length of the screw 7'. The gears 50, 51 and 52 also act as restraining members holding the screw 7' in position.

Another modification is shown in FIGS. 6 through 10 in which a flexible curved conveyor screw 54 is supported in a curved section 55 of the screw driven conveyor 1. The driven platforms 3, as shown in FIG. 1 are propelled along a straight section 56 to a station at one end of the conveyor 1 and then carried around the curved section 55 to another straight section where the platforms are propelled to the other end of the conveyor. FIG. 6 shows a typical turnaround at one end of the conveyor 1 but with the curved section 55 broken away and only the incoming straight section 56 being illustrated. The straight section 56 is part of the conveyor 1 shown in FIGS. 1, 2 and 3 with the screw 7 having a central shaft 8 which is generally rigid and a helical rib or rail 9 extending around the shaft at a spaced-apart distance and connected to the shaft by radially extending spokes 12. The screw 7 is supported by a supporting structure 13 substantially identical to the construction described heretofore and accordingly the parts are numbered on the drawings but the description has not been repeated.

The flexible curved conveyor screw 54 has a continuous flexible helical rib such as rail 57 extending around a flexible shaft 58 which may consist of a coil spring having the property of transmitting torque while at the same time conforming to said curved section 55, as shown in FIG. 6. The rail 57 is connected to the flexible shaft 58 by radially extending spokes 59 which may be attached to the shaft and rail at appropriate circumferentially spaced-apart positions along the length of the shaft. The flexible curved conveyor screw 54 has an end 60 connected to the screw 7 with the rail 57 being fastened as by welding to the rail 9 and the flexible shaft 58 being fastened to the central shaft 8 of screw 7 by clamps (not shown) or by other suitable fastening means. Accordingly, when the screw 7 is rotated, this rotation will be transmitted to the flexible curved conveyor screw 54 providing rotation thereof.

As shown in FIGS. 6 and 7, the screw 54 is supported by supporting structures 63 located at intervals along the length of the curved section 55. Each of the supporting structures 63 has a base (not shown) and side members 64 and 65 all of which may be of steel plates welded together or other suitable material with the base mounted on a suitable foundation. Each of the side members 64 and 65 are in the form of a yoke having an opening 66 in the center for the screw 54. The side members 64 and 65 have arms 67 and 68 for supporting an outer roller 69 and an inner roller 70 therebetween. A lower roller 73 is also rotatably mounted beneath the screw 54 and between the side members 64 and 65.

The outer roller 69, inner roller 70 and lower roller 73 have end shafts 74, 75 and 76, respectively, which extend through the side members 64 and 65 and are held in position by snap rings 77. Shims 78 may be interposed between the ends of the rollers 69, 70 and 73 and the side members 64 and 65. Suitable bearings (not shown) may be mounted in the side members 64 and 65 for carrying the end shafts, 74, 75 and 76.

As shown in FIG. 6, the rail 57 has a radially outer surface 79 which is in engagement with the rollers 69, 70, and 73 in the curved section 55. The outer roller 69, inner roller 70 and lower roller 73 are mounted at circumferentially spaced-apart positions around the screw 54 with the distance between adjacent rollers being less than the outer diameter of the radially outer surface 79 of the rail 57, as shown in FIG. 7. The rollers 69, 70 and 73 are also mounted on the side members 64 and 65 with the angular spacing of one of the rollers with relation to the other two rollers being at angle greater than 90° around the circumference of the screw 54. The outer roller 69 and inner roller 70 have supporting surfaces 82 and 83, respectively, in rolling engagement with the radially outer surface 79 of the rail 57 and these outer supporting surfaces are shaped to conform to the outer curvature of the screw 54. The supporting surface 82 of the outer roller 69 is concave to conform with the outer curvature of the screw 54. The supporting surface 83 of the inner roller 70 is convex to conform to the radially inner curvature of the screw 54. The lower roller 73 has a supporting surface 84; however, this may be straight since the bottom configuration of the screw 54 is all in one plane and the supporting surface need not be curved.

In operation, the electric motor 28 rotates the screw 7 as described heretofore. The curved conveyor screw 54 which is connected to the screw 7 is consequently also rotated. As the screw 54 rotates, the outer roller 69, inner roller 70 and lower roller 73 of each of the supporting structures 63 hold the screw radially in position. The opening 66 between the outer roller 69 and inner roller 70 provides a space for the entrance of the stub shaft 43 and wheel 44 attached to the platforms 33 and thereby permits uninterrupted movement of the platforms along the screw 54 in the same manner as they move along the screw 7.

Although a flexible curved conveyor screw 54 has been shown with a flexible shaft 58 connected by spokes 59 to the rail 57, it may be desirable in some applications to use a screw without a central shaft and spokes and made up only of the helical rail 57.

From the foregoing, it can be seen that by using the rollers of the invention in enveloping support, enveloping drive and tangential drive dispositions, the drive screw may be held in position against thrust forces and transverse forces and the screw may be rotatably driven without obstructing the connection between the platform and the driving helical rail of the screw.

While certain representative embodiments and details have been shown for the purpose of illustrating the invention, it will be apparent to those skilled in the art that various changes and modifications may be made therein without departing from the spirit or scope of the invention.

I, therefore, particularly point out and claim as my invention:

1. A screw driven conveyor having a driven platform, a screw with a continuous helical rib having a radially outer cylindrical surface and a continuous helical driving surface providing a helical groove with a cylindrical surface at the root diameter of said screw, and a driven member mounted on said platform and extending into said helical groove in continuous driven engagement with said helical driving surface of said helical rib comprising a supporting structure, at least three roller members mounted on said supporting structure at circumferentially spaced-apart positions around said screw with the distances between said roller members being less than the outer diameter of said outer surface of said helical rib and the angular spacing of one of said roller members with relation to at least two other roller members being at angles greater than 90° around the circumference of said screw, each of said roller members having a length less than the length of said screw and being in rolling engagement with at least one of said cylindrical surfaces of said screw, one of said cylindrical surfaces of said screw having gear teeth and the outer surface of one of said roller members having gear teeth for meshing engagement with said gear teeth of said screw, and power means to rotate the roller member in meshing engagement with said screw whereby radial movement of said screw in all directions is restrained for positively holding the roller member in meshing engagement with said screw and said screw is rotated moving said driven member axially of said screw in said helical groove between said roller members and thereby propelling said driven platform along the length of said screw.

2. A screw driven conveyor having a driven platform, a screw with a continuous helical rib having a radially outer surface and a continuous helical driving surface providing a helical groove and a driven member mounted on said platform and extending into said helical groove in continuous driven engagement with said helical driving surface of said helical rib comprising a supporting structure, at least three roller members mounted on said supporting structure at circumferentially spaced-apart positions around said screw with the distances between said roller members being less than the outer diameter of said outer surface of said helical rib and the angular spacing of one of said roller members with relation to at least two other roller members being at angles greater than 90° around the circumference of said screw, said roller members having a length less than the length of said screw and being in rolling engagement with the radially outer surface of said helical rib, said radially outer surface of said helical rib having gear teeth and the outer surface of one of said roller members having gear teeth for meshing engagement with said gear teeth on said helical rib, and power means to rotate the roller member in meshing engagement with said helical rib whereby radial movement of said screw in all directions is restrained for positively holding the roller member in meshing engagement and said screw is rotated moving said driven member axially of said screw in said helical groove between said roller members and thereby propelling said driven platform along the length of said screw.

3. A screw driven conveyor having a driven platform, a screw with a continuous helical rib having a radially outer surface and a continuous helical driving surface providing a helical groove and a driven member mounted on said platform and extending into said helical groove in continuous driven engagement with said helical driving surface of said helical rib comprising a supporting structure, at least three roller members mounted on said supporting structure at circumferentially spaced-apart positions around said screw with the distances between said roller members being less than the outer diameter of said outer surfaces of said helical rib and the angular spacing of one of said roller members with relation to at least two other roller members being at angles greater than 90° around the circumference of said screw, said roller members having a length less than the length of said screw and being in rolling engagement with the radially outer surface of said helical rib, one of said roller members having a cylindrical outer surface with a helical groove, said screw having a load bearing surface at the root diameter, gear teeth on said load bearing surface, said helical rib of said screw extending into said groove and gear teeth on said cylindrical surface of the roller member in meshing engagement with said gear teeth of said load bearing surface and power means to rotate the roller member whereby radial movement of said screw in all directions is restrained to positively hold the roller member in meshing engagement with said screw and said screw is rotated moving said driven member axially of said screw in said helical groove between said roller members and thereby propelling said driven platform along the length of said screw.

4. A screw driven conveyor according to claim 3 wherein said load bearing surface has a greater diameter than other surfaces at the root diameter of said screw.

5. A screw driven conveyor having a curved section and a driven platform movable through said curved section, a continuous flexible curved screw having a continuous helical rib with a radially outer surface and a continuous helical driving surface providing a helical groove and a driven member mounted on said platform and extending into said helical groove in continuous driven engagement with said helical driving surface of said helical rib in said curved section comprising a supporting structure located at a position along said curved section, at least three roller members mounted on said supporting structure at circumferentially spaced-apart positions around said screw with the distance between said roller members being less than the outer diameter of said outer surface of said flexible helical rib and the angular spacing of one of said roller members with relation to at least two other roller members being at angles greater than 90° around the circumference of said screw to permit axial movement of said driven member between said roller members without engagement with said driven member or said platform, said roller members having supporting surfaces in rolling engagement with said radially outer surface of said flexible helical rib and each of said supporting surfaces of said roller members being shaped to conform with the curvature of said screw.

6. A screw driven conveyor according to claim 5 wherein one of said roller members is located at the inner diameter of said curved screw and has an outer supporting surface with a convex configuration to conform with the curvature of said screw at the inner diameter.

7. A screw driven conveyor according to claim 5 wherein one of said roller members is located at the outer diameter of said curved screw and has a supporting surface with a concave configuration to conform with the curvature of said screw at the outer diameter.

8. A screw driven conveyor having a curved section and a driven platform movable through said curved section, a continuous flexible curved screw having a continuous helical rib with a radially outer surface and a continuous helical driving surface providing a helical groove and a driven member mounted on said platform and extending into said helical groove in continuous driven engagement with said helical driving surface of said helical rib in said curved section comprising a plurality of supporting structures located at spaced-apart intervals along said screw, each of said supporting structures having at least three roller members at circumferentially spaced-apart positions around said screw with the distance between said roller members being less than the outer diameter of said outer surface of said flexible helical rib and the angular spacing of one of said roller members with relation to at least two other roller members being at angles greater than 90° around the circumference of said screw to permit axial movement of said driven member between said roller members without engagement with said driven member or said platform, said roller members having supporting surfaces in rolling engagement with said radially outer surface of said flexible helical rib and each of said supporting surfaces of said roller members being shaped to conform with the curvature of said screw.

9. A screw driven conveyor comprising a screw having a straight section, a curved section and a driven platform movable through said straight section and said curved section, a rigid screw with a continuous helical rib in said straight section, a flexible screw with a continuous flexible helical rib in said curved section, each of said screws having a radially outer surface and a continuous helical driving surface providing a helical groove and a driven member mounted on said platform and extending into said helical groove in continuous driven engagement with said helical driving surface of said helical rib, means for driving said rigid shaft in said straight section and guide means located at intervals around said curved section to restrain radial movement of said flexible helical rib in said curved section, each of said guide means including a supporting structure having at least three roller members mounted on said supporting structure at circumferentially spaced-apart positions around said screw with the distance between said roller members being less than the outer diameter of said outer surface of said flexible helical rib and the angular spacing of one of said roller members with relation to at least two other roller members being at angles greater than 90° around the circumference of said screw to permit axial movement of said driven member between said roller members without engagement with said driven member or said platform, said roller members having supporting surfaces in rolling engagement with said radially outer surface of said flexible helical rib and each of said supporting surfaces of said roller members being shaped to conform with the curvature of said flexible helical rib.

* * * * *

UNITED STATES PATENT OFFICE
CERTIFICATE OF CORRECTION

PATENT NO. : 3,866,538
DATED : February 18, 1975
INVENTOR(S) : Thomas Forsey, Jr It is certified that error appears in the above-identified patent and that said Letters Patent are hereby corrected as shown below:

Column 4, line 24, "now" should read --not--.

Signed and sealed this 1st day of July 1975.

(SEAL)
Attest:

RUTH C. MASON
Attesting Officer

C. MARSHALL DANN
Commissioner of Patents
and Trademarks